United States Patent
Gabi et al.

(10) Patent No.: US 8,986,626 B2
(45) Date of Patent: Mar. 24, 2015

(54) PROBE ARRANGEMENT FOR EXCHANGING IN A CONTROLLABLE WAY LIQUIDS WITH MICRO-SIZED SAMPLES OF MATERIAL LIKE BIOLOGICAL CELLS

(75) Inventors: Michael Gabi, Zurich (CH); Janos Vörös, Zurich (CH); Tomaso Zambelli, Zürich (CH); Pascal Behr, Zürich (CH)

(73) Assignee: ETH Zürich / ETH Transfer, Zürich (CH)

(*) Notice: Subject to any disclaimer, the term of this patent is extended or adjusted under 35 U.S.C. 154(b) by 331 days.

(21) Appl. No.: 12/737,557

(22) PCT Filed: Jul. 24, 2009

(86) PCT No.: PCT/EP2009/005393
§ 371 (c)(1),
(2), (4) Date: Jan. 25, 2011

(87) PCT Pub. No.: WO2010/012423
PCT Pub. Date: Feb. 4, 2010

(65) Prior Publication Data
US 2011/0124027 A1 May 26, 2011

(30) Foreign Application Priority Data
Jul. 28, 2008 (EP) ..................... 08013528

(51) Int. Cl.
*B01L 3/00* (2006.01)
*B01L 3/02* (2006.01)
*B82Y 35/00* (2011.01)
*G01Q 30/14* (2010.01)
*G01Q 70/02* (2010.01)

(52) U.S. Cl.
CPC ............. *B01L 3/0244* (2013.01); *B82Y 35/00* (2013.01); *G01Q 30/14* (2013.01); *G01Q 70/02* (2013.01); *B01L 3/0293* (2013.01); *B01L 2400/0484* (2013.01); *Y10S 977/864* (2013.01)
USPC .......................... 422/501; 977/864

(58) Field of Classification Search
USPC ................................. 422/501, 521
See application file for complete search history.

(56) References Cited

U.S. PATENT DOCUMENTS 4,429,583 A * 2/1984 Watanabe et al. .......... 73/864.12
6,353,219 B1 3/2002 Kley
(Continued)

FOREIGN PATENT DOCUMENTS

EP 1 189 016 A1 3/2002
EP 1 990 626 A1 11/2008
(Continued)

OTHER PUBLICATIONS

Meister et al., "FluidFM: Combining Atomic Force Microscopy and Nanofluidics in a Universal Liquid Delivery System for Single Cell Applications and Beyond," Nano Letters, ACS, Washington DC, 2009, Jun. 1, vol. 9, No. 6, pp. 2501-2507.
(Continued)

*Primary Examiner* — Natalia Levkovich
(74) *Attorney, Agent, or Firm* — Pauley Petersen & Erickson

(57) ABSTRACT

The invention relates to a probe arrangement (10g) for exchanging in a controllable way liquids with micro-sized samples of material like biological cells, especially in connection with an scanning probe microscope, said probe arrangement (10g) comprising a probe holder (11) with at least one embedded first channel (18) and a cantilever (12) with at least one embedded second channel (15) and being provided to be attached to said probe holder (11) in a way that at least one aperture (19) of the first channel (18) is connected to at least one aperture (17) of the second channel (15) in a way that permits the liquid-tight transfer of a liquid between said first and second channels (15, 18). A safe and easy use of the probe arrangement is achieved by having the cantilever (12) permanently attached to said probe holder (11) to form a prefabricated probe unit (10g).

17 Claims, 3 Drawing Sheets

(56) References Cited

U.S. PATENT DOCUMENTS

| | | | |
|---|---|---|---|
| 7,114,405 B2 | 10/2006 | Sünwoldt et al. | |
| 2002/0117517 A1* | 8/2002 | Unger et al. | 222/214 |
| 2004/0022689 A1* | 2/2004 | Wulf et al. | 422/100 |

FOREIGN PATENT DOCUMENTS

| | | |
|---|---|---|
| JP | 9-251979 A2 | 9/1997 |
| JP | 2006-145510 A2 | 6/2006 |
| WO | WO 03/028036 A1 | 4/2003 |

OTHER PUBLICATIONS

Deladi et al., "Micromachined fountain pen for atomic force microscope-based nanopattering," Applied Physics Letters, AIP, Amer. Inst. of Physics, Melville, NY., Jan. 1, 2004, vol. 85, No. 22, pp. 5361-5363.

* cited by examiner

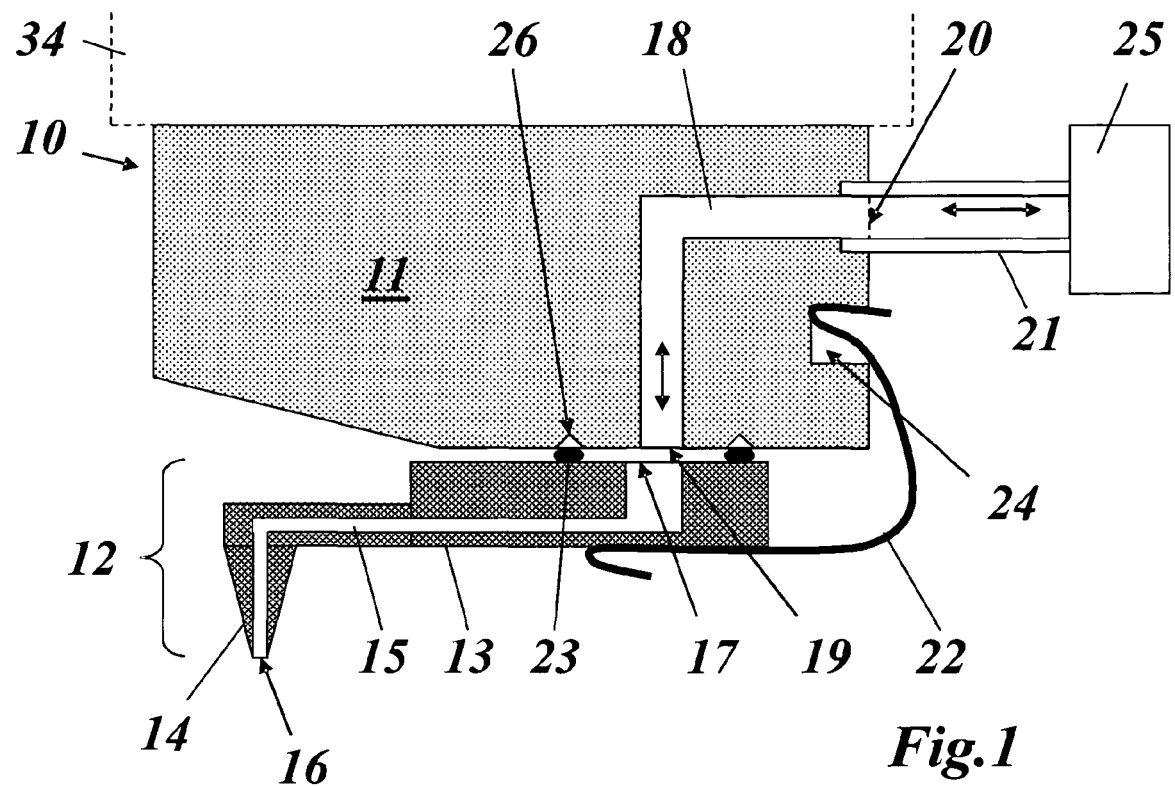
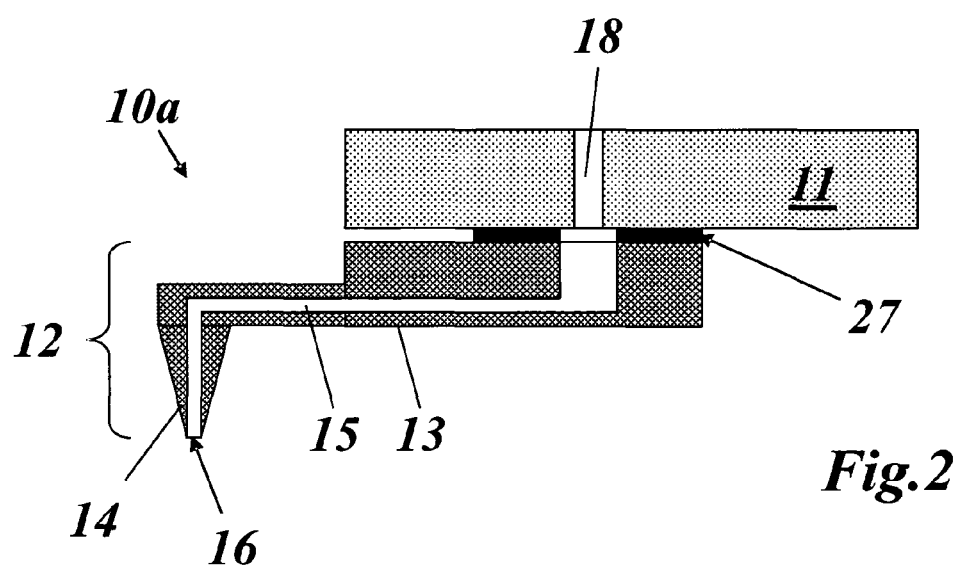

PROBE ARRANGEMENT FOR EXCHANGING IN A CONTROLLABLE WAY LIQUIDS WITH MICRO-SIZED SAMPLES OF MATERIAL LIKE BIOLOGICAL CELLS

BACKGROUND OF THE INVENTION

1. Field of the Invention

The invention pertains to the field of the systems for exchanging in a controlled way liquids with micro-sized samples of material like biological cells, or the like. It refers to a probe arrangement for exchanging in a controllable way liquids with micro-sized samples of material like biological cells, especially in connection with a scanning probe microscope, according to the preamble of claim 1.

2. Discussion of Related Art

Background of the invention It is well-known in the art to use scanning probe microscopes, especially in the form of scanning force microscopes, to examine and non-destructively characterize surfaces of a specimen (see for example U.S. Pat. No. B2-7,114,405). The mounting of probes utilized for examining a specimen is of decisive significance for the operation of a scanning probe microscope. In any scanning probe microscope, the probe must be secured in such a way that a respective measured physical variable can be detected in dependence upon a distance between the specimen and a measuring tip of the probe. One type of scanning probe microscopy is scanning force microscopy with which a spring pole is used as the probe, normally referred to as a cantilever. There is a measuring tip at one end of the cantilever. The probe (cantilever) preferably consists of silicon, but other materials may be used as well, such as silicon nitride or diamond. As a rule, the cantilever, including its measuring tip, is mounted on a substrate, sometimes referred to as base or probe holder. Adequate mounting of the cantilever must meet the corresponding diverse requirements as well. Two kinds of mounting the cantilever in a scanning probe microscope are known in the art. With one of them, the cantilever is either attached by gluing or retained by means of a liquid which has adhesive properties. The second type of known mounting is fully mechanical, usually implemented by means of a spring. Fastening of the cantilever by means of an adhesive is unsuitable for many scanning probe microscopes since the most frequently applied adhesive materials produce a long lasting bond between the probe and a retaining member to which the probe is to be fixed, a bond which can be severed only by taking recourse to solvents. Besides, the use of adhesive materials is very critical for operating scanning probe microscopes in liquids because the liquid within which the probe is located may undergo chemical changes caused by interaction with the adhesive material. For this reason, mechanical fastening by means of some spring retention often is selected (see FIG. 1 of the present application).

It is also well-known in the art (see EP-A1-I 990 626), to use a cantilevered probe arrangement including micro channels that may be controllable by a drive for performing analysis and/or manipulation of micro-sized samples of material, in, e.g., a fluid environment constituting, for example, biological material. The cantilever probe tip may for example be employed to perform electrophysiological tests in accordance to, for example, various modes such as a static and a scanning mode of samples of biological material such as biological tissue; an individual cell as well as elements thereof including vesicles, cell membrane and portions thereof, lipid bilayers and artificial lipid bilayers. The micro-channels enable the release of fluids and the collection of samples in the very range where the electrophysiological tests are performed. One of the main applications of such a cantilever probe arrangement is associated to cell biology, such as intracellular injection or sampling of the cytoplasm, extracellular drug release or sampling of the environmental buffer in relative proximity close to the cell by means of the force-controlled cantilever probe tip.

However, in using the micro fabricated cantilevers with their internal micro channels with a scanning probe microscope, one has to mount the cantilevers on a suitable probe holder, such that the cantilever is securely fixed to said probe holder in a correct position. At the same time, a liquid-tight connection between the cantilever and the probe holder has to be established, so that liquid can be exchanged under a defined pressure between an (external or internal) liquid reservoir and the sample to be probed. This is a difficult task in the normal environment of a laboratory, and may result in damaging the cantilever or failing to achieve a pressure-tight connection between the cantilever and the probe holder.

SUMMARY OF THE INVENTION

It is therefore an objection of the present invention to provide a probe arrangement, which is easy to use and precludes any failures with regard to the positioning and hydraulic connection of the cantilever.

According to the invention the cantilever is permanently attached to said probe holder to form a prefabricated probe unit.

According to one embodiment of the invention said cantilever is attached to said probe holder in a form fitting manner. The form-fit simplifies the positioning and sealing of the cantilever relative to the probe holder.

According to another embodiment of the invention said cantilever is attached to said probe holder by means of an adhesive joint. The adhesive joint is space-saving and simple to apply and may be used as a sealing. The adhesive can be chosen to be compatible with the liquid flowing through the joint. However, it may be combined with additional sealing means.

According to another embodiment of the invention said cantilever is attached to said probe holder by means of a welding joint. The cantilever may be either welded directly with the probe holder material or by adding an additional compound (metallic or polymeric) between cantilever and probe holder.

According to another embodiment of the invention a sealing material may be generally provided between said cantilever and said probe holder.

According to another embodiment of the invention said sealing material includes a liquid compatible, elastic material having a Young's modulus of <150 GPa, preferably between 0.01 GPa and 0.2 GPa.

According to another embodiment of the invention the elastic material between the cantilever and the probe holder is a polymer, especially one of KALREZ®, poly(dimethyl siloxane), Poly (acrylonitrile, butadiene, styrene), vinyl acetate, acrylates, polyamides, acetal resins, poly(vinylidene fluoride), poly(vinylidene chloride), poly(ethylene, propylene butylene . . .), polyetheretherketone, polyurethane, silicone, polyisobutylene, epoxy, poly (ethylene therepthalate), polyimide, polycarbonate, polysulfones, natural rubbers or anything similar.

According to another embodiment of the invention the elastic material between the cantilever and the probe holder is a metal or a metal alloy containing Pb, Zn, Sn, In, Sb or Ag.

According to another embodiment of the invention said cantilever is micro fabricated and made of one of Si, SiO2, SiN, GaAs, SiGe or a polymeric material, benzocyclobutene (BCB), benzocyclobutene (BCB), Parylene, Polyamide, Acrylic (PMMA), poly-dimethylsiloxane PDMS, liquid crystal polymer (LCP), liquid crystal elastomer (LCE), fluorocarbon, a piezoelectric polymer, a functional hydrogel, polyurethane or novolack.

According to another embodiment of the invention the probe holder is optically transparent enabling optical access to the cantilever, including access for laser based force feedback. With such a probe holder the force-feedback capability of a scanning probe microscope can be used when the probe unit is mounted thereon.

According to another embodiment of the invention the cantilever has a tip, and said second channel has two apertures, one of them at the apex of the tip of the cantilever, the other being connected to the at least one aperture of the probe holder. With such a cantilever the exchange of liquid with a sample can be done with utmost precision.

According to another embodiment of the invention the at least one probe holder channel ends at least at two apertures, one of them being connected to a cantilever aperture, another one being connected to a liquid handling means, especially a reservoir for a liquid.

Especially, said probe holder may comprise a built-in reservoir, which is connected to said first channel of said probe holder.

According to another embodiment of the invention the probe holder comprises a pressure chamber containing at least one built-in liquid reservoir to control the pressure used to press the liquid out of the reservoir through the hollow cantilever and tip opening or suck in liquid from the tip back into the cantilever or a built-in reservoir in the probe holder.

According to another embodiment of the invention said built-in liquid reservoir and/or said pressure chamber is connected to a pressure controller.

According to another embodiment of the invention the cantilever channel has inner dimensions with a width and height between 0.1 µm and 1 mm, preferably between 1 µm and 100 µm, and a length between 1 µm and 10 mm, preferably between 20 µm and 1 mm.

According to another embodiment of the invention said cantilever is permanently attached to said probe holder by mechanical and/or magnetic forces, preferably using at least one spring, clamp, or screw.

According to another embodiment of the invention the probe holder contains positioning means, especially in form of a groove, for precise positioning of the various elements during the mounting of the probe unit.

According to the invention the inventive probe arrangement is applied as a probe in a scanning probe microscope, preferably with a force feed-back system based on a laser or a piezo-resistive effect.

BRIEF DESCRIPTION OF THE DRAWINGS

The invention will be explained below by means of various embodiments and with reference to the drawings.

FIG. 1 shows a configuration of a cantilever removably attached to a probe holder by means of a spring;

FIG. 2 shows a first embodiment of the probe unit according to the invention, wherein the cantilever is adhesively attached to the probe holder at its lower side;

DESCRIPTION OF PREFERRED EMBODIMENTS

Figure 3:
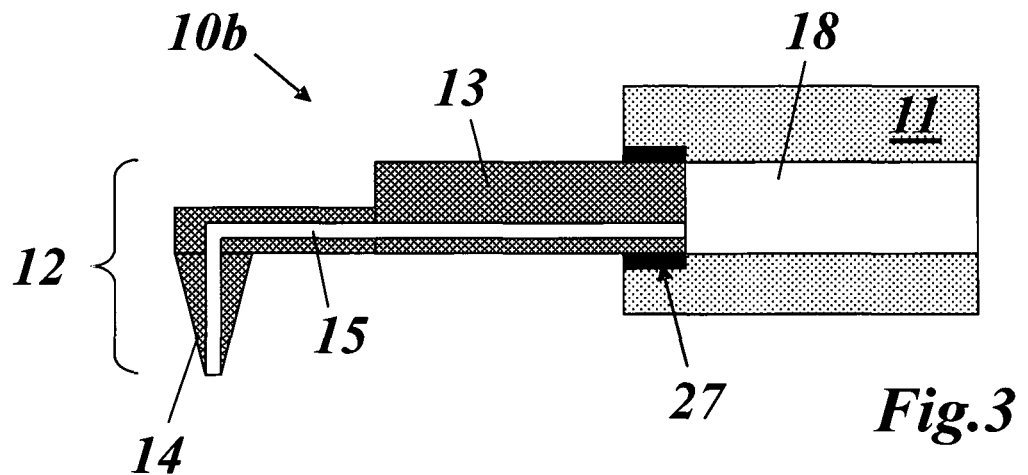
FIG. 3 shows a second embodiment of the probe unit according to the invention, wherein the cantilever is attached to the probe holder in a form fitting and sealing manner.

Detailed description Inspired by the operation mode of the atomic force microscope (AFM), a micro fabricated, channeled cantilever has been used, i.e. a cantilever with an embedded channel in order to be able to dispense or collect liquid with force control. As shown in FIG. 1, the channeled cantilever 12 is part of a chip which allows the mounting to a probe holder 11 and the connection to a liquid delivery or collection system (liquid handling means 25). The embedded channel 15 of the cantilever 12 starts from the hollow tip 14 of the cantilever 12 and ends in the chip body 13. Consequently, two apertures 16 and 17 are foreseen at both extremities of the channel 15: the first (17) at the surface of the chip body 13, and the second (16) at the surface of the cantilever 12. The cantilever may be eventually provided with a hollow tip 14: in this case, the second aperture (16) is at the surface of the tip 14, as shown in FIG. 1.

On the other hand, a probe holder 11 is fabricated in such a way as to have an embedded channel 18 ending at both sides in an aperture 19 and 20 at the external surface of the probe holder 11. The cantilever chip 1.2 and the probe holder 11 are aligned in such a way that the aperture 17 on the cantilever chip 12 and one of the two apertures 19, 20 of the probe holder 11 coincide. The cantilever chip 12 and the probe holder channel 18 are then clamped together with a spring 22, or other means. A polymer is deposited to form an O-ring like structure or sealing 23 for sealing purposes between the cantilever chip 12 and the probe holder 11.

Figure 7:
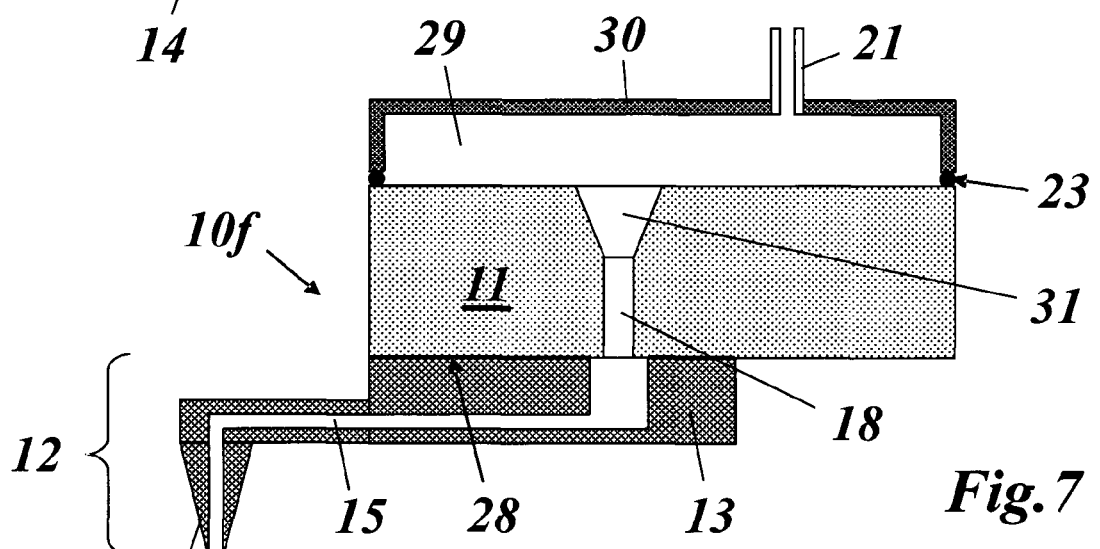
FIG. 7 shows a sixth embodiment of the probe unit according to the invention, wherein the probe holder comprises a built-in reservoir, and bears a pressure chamber at its upper side, which is connected by an external tube to an external pressure controller.
Figure 8:
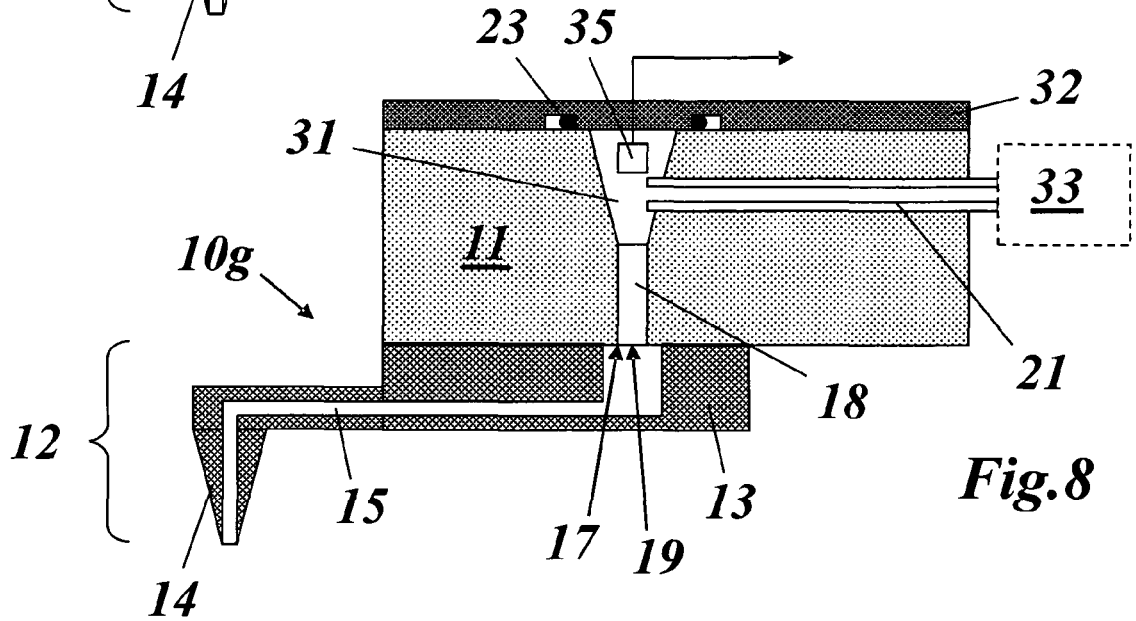
FIG. 8 shows a seventh embodiment of the probe unit according to the invention, wherein a built-in reservoir in the probe holder is closed by a cover and connected to an external pressure controller by means of an external tube.

The polymer could be KALREZ®, poly(dimethyl siloxane), Poly (acrylonitrile, butadiene, styrene), vinyl acetate, acrylates, polyamides, acetal resins, poly(vinylidene fluoride), poly(vinylidene chloride), poly(ethylene, propylene butylene . . .), polyetheretherketone, polyurethane, silicone, polyisobutylene, epoxy, poly (ethylene therepthalate), polyimide, polycarbonate, polysulfones, natural rubbers or anything similar. The polymer may also be eventually enriched with particles, beads or fibers for reinforcement. The other aperture 20 of the probe holder 11 can be connected by an external tube 21 to whatever liquid reservoir or to Instead of having an external liquid reservoir, the reservoir can also be built-in into the probe holder In the embodiment of FIG. 7, the probe holder 11 of the probe unit 10f comprises a built-in reservoir 31, which is connected to the channel 18 of the probe holder 11, at one side, and to a pressure chamber 29, at the other side. The pressure chamber 29 is the interior of a cap 30, which sits on top of the probe holder 11 and is sealed by means of a sealing 23. In the embodiment of FIG. 8, the built-in reservoir 31 is directly covered by means of a sealed cover 32. That allows the user to pipette easily small amounts of liquid into the built-in reservoir 31. The built-in reservoir 31 can be connected to an external pressure controller (33 in probe unit 10g in FIG. 8) either directly or via the pressure chamber 29 by mans of an external tube 21 to control the positive or negative pressure inside the liquid reservoir 31. This way the liquid can be ejected with a chosen pressure or local liquid samples can be sucked into the hollow cantilever 12 or into the liquid reservoir 31.

In this way, a continuous fluidic path is established from the aperture 16 of the cantilever 12 to the external tube 21 which is eventually connected to the probe holder 11 or built-in liquid reservoir 31. Thanks to the AFM force control, the channeled cantilever 12 can be approached onto whatever object and the liquid filling the fluidic path 15, 18 can be locally dispensed from the tip aperture 16.

Figure 4:
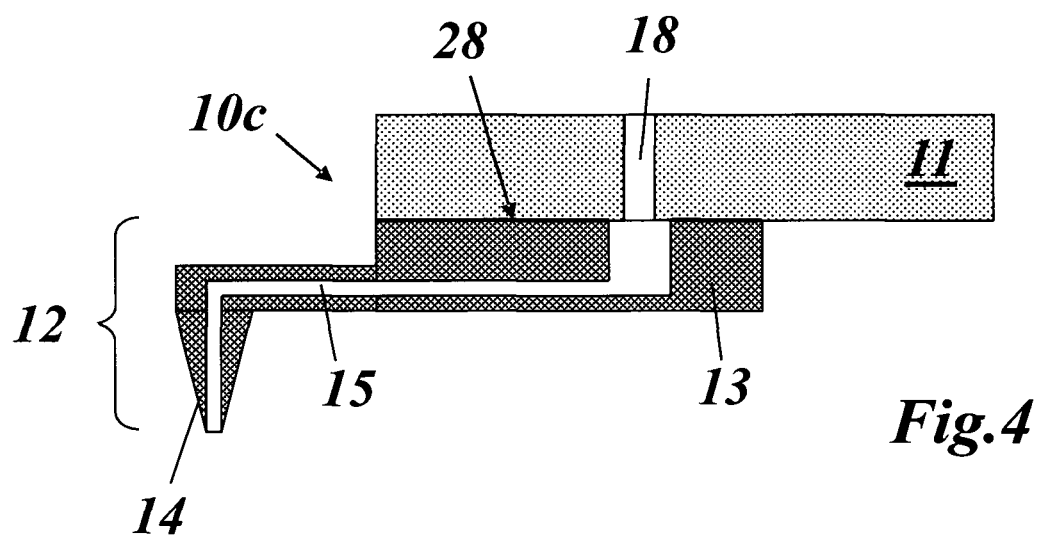
FIG. 4 shows a third embodiment of the probe unit according to the invention, wherein the cantilever is attached to the probe holder at its lower side by means of a weld.
Figure 5:
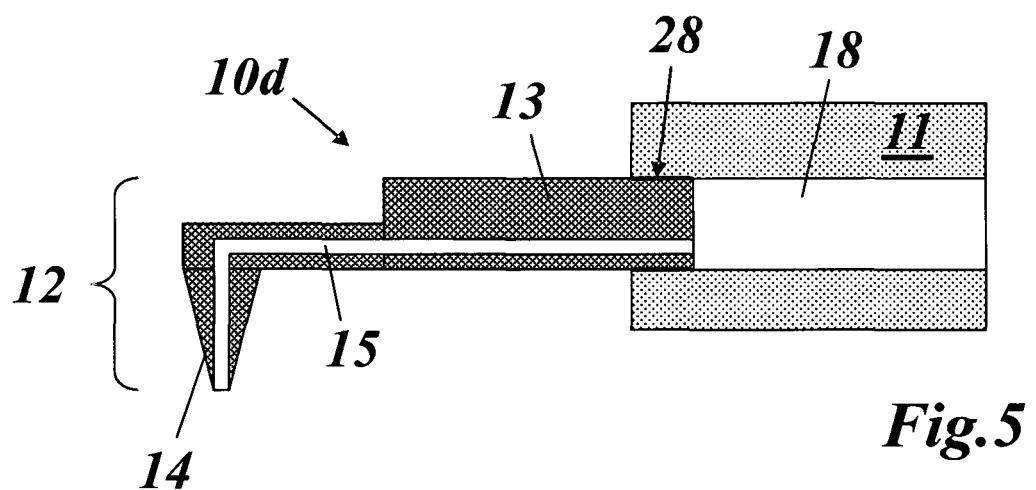
FIG. 5 shows a fourth embodiment of the probe unit according to the invention, wherein the cantilever is attached to the probe holder in a form fitting and sealing manner by means of a weld.
Figure 6:
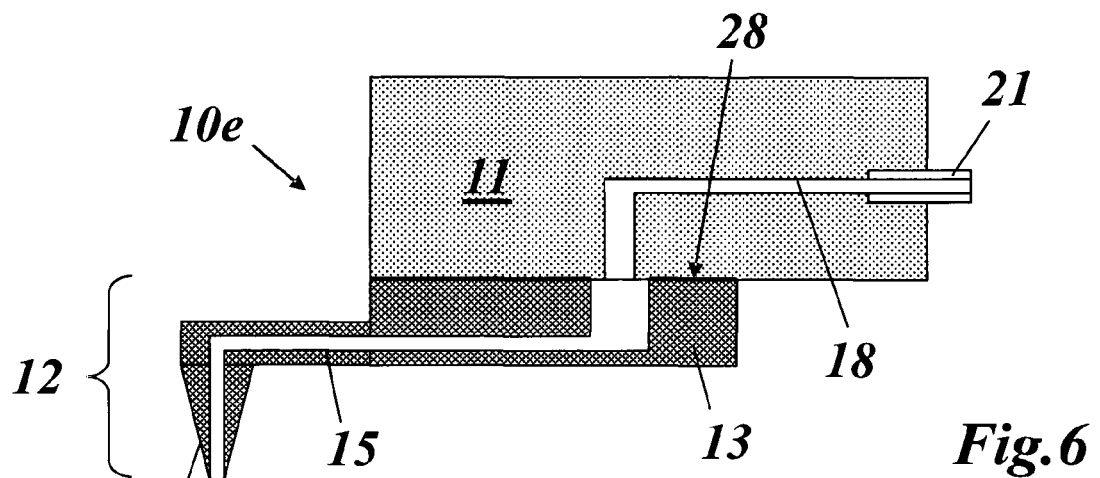
FIG. 6 shows a fifth embodiment of the probe unit according to the invention similar to FIG. 4, wherein the probe holder is connected by an external tube to an external pressure controller.

To form the prefabricated probe unit, the cantilever 12 can be attached to the probe holder 11 either by gluing it to the lower side of the probe holder 11 with an adhesive 27 (probe unit 10a in FIG. 2), or from a side in a form fitting manner (probe unit 10b in FIG. 3). Furthermore, it may be attached to the lower side of the probe holder 11 by means of a weld 28 (probe unit 10c in FIG. 4), or welded to the probe holder 11 from a side in a form fitting manner (probe unit 10d in FIG. 5). The welded probe unit of FIG. 4 may be connected to an external pressure controller (33 in FIG. 8) by means of an external tube 21 (probe unit 10e in FIG. 6). Furthermore, electrodes (35 in FIG. 8) can be built into the reservoirs 31 to measure electric currents through the hollow cantilever 12 used for measuring the electrophysiology of living cells.

The cantilever 12 can be a hollow bar with an opening 16 at the tip 14 or a more complex structure can be attached, such as pyramid or hemisphere. Besides a pyramid or hemisphere, a tube shaped tip may be provided at the cantilever 12.

The probe holder 11 can be designed like a drawer with rails/slides allowing a fast mounting on the scanning probe microscope or AFM.

EXAMPLE

A channel was drilled into a commercial AFM probe holder made of polycarbonate. This channel ended in two apertures: one at the bottom surface (lower side) of the probe holder, while the other at its lateral surface. The lateral aperture was connected with a liquid reservoir through tubing. The aperture at the bottom base of the probe holder was connected to a micro channeled cantilever chip. A two component material (LOT Oriel, SP-90-10) was deposited onto the bottom channel aperture of the probe holder to form an O-ring like sealing structure. The sealing could also be made of any elastic material which is compatible with the liquid solution filling the channels during the experiment The inner diameter of the sealing was preferentially equal to the diameter of the bottom aperture and the outer diameter was larger than the channel opening on the chip body containing the cantilever. The chip body was aligned according to a groove (26 in FIG. 1) or markings eventually present on the probe holder and pressed against the sealing by a force, which was in this case exerted by a metal spring. The force could have also been applied by any other mechanical device e.g. involving screws or by a device involving magnetic components.

The invention claimed is:

1. A probe arrangement (10a-g) for exchanging liquids with micro-sized samples of material by means of an Atomic Force Microscope (AFM), the probe arrangement comprising:
   a probe holder (11) of an Atomic Force Microscope (AFM) with at least one embedded first channel (18); and
   a cantilever (12) with at least one embedded second channel (15), the cantilever (12) attachable to said probe holder (11) in a way that at least one aperture (19) of the first channel (18) is connected to at least one aperture (17) of the second channel (15) to permit the liquid-tight transfer of a liquid between said first and second channels (15, 18), wherein said cantilever (12) is permanently attached to said probe holder (11) to form a prefabricated probe unit (10a-g) and wherein said probe holder (11) is optically transparent enabling optical access to said cantilever (12), including access for laser based feedback.

2. A probe arrangement according to claim 1, wherein said cantilever (12) is attached to said probe holder (11) in a form fitting manner.

3. A probe arrangement according to claim 1 comprising an adhesive joint (27) permanently attaching said cantilever (12) to said probe holder (11).

4. A probe arrangement according to claim 1 wherein said cantilever (12) is attached to said probe holder (11) with a welding joint (28).

5. A probe arrangement according to claim 1 wherein a sealing material is provided between said cantilever (12) and said probe holder (11).

6. A probe arrangement according to claim 5, wherein said sealing material includes a liquid compatible, elastic material having a Young's modulus of <150 GPa.

7. A probe arrangement according to claim 6, wherein the elastic material between the cantilever (12) and the probe holder (11) is a polymer, comprising at least one of KAL-REZ®, poly(dimethyl siloxane), Poly (acrylonitrile, butadiene, styrene), vinyl acetate, acrylates, polyamides, acetal resins, poly(vinylidene fluoride), poly(vinylidene chloride), poly(ethylene, propylene butylene), polyetheretherketone, polyurethane, silicone, polyisobutylene, epoxy, poly (ethylene therepthalate), polyimide, polycarbonate, poly-sulfones, natural rubbers or anything similar.

8. A probe arrangement according to claim 6 wherein the elastic material between the cantilever (12) and the probe holder (11) is a metal or a metal alloy containing at least one of Pb, Zn, Sn, In, Sb and Ag.

9. A probe arrangement according to claim 1 wherein said cantilever (12) is micro fabricated and made of at least one of Si, SiO2, SiN, GaAs, SiGe or a polymeric material, benzocyclobutene (BCB), benzocyclobutene (BCB), Parylene, Polyamide, Acrylic (PMMA), poly-dimethylsiloxane PDMS, liquid crystal polymer (LCP), liquid crystal elastomer (LCE), fluorocarbon, a piezoelectric polymer, a functional hydrogel, polyurethane or novolack.

10. A probe arrangement according to claim 1 wherein the cantilever (12) further comprises:
   a tip (14), and said second channel (15) includes two apertures (16, 17), one of the two apertures (16, 17) at the apex of the tip (14) of the cantilever (12), the other of the two apertures (16, 17) being connected to the at least one aperture (19) of the probe holder (11).

11. A probe arrangement according to claim 1 wherein the at least one probe holder channels (18) ends at least at two apertures (19, 20), one of them being connected to a cantilever aperture (17), another one being connected to a liquid handling means (25, 31), especially a reservoir (31) for a liquid.

12. A probe arrangement according to claim 1 wherein said probe holder (11) further comprises:
a built-in reservoir (3)), which is connected to said first channel (18) of said probe holder (11).

13. A probe arrangement according to claim 1 wherein said probe holder further comprises:
a pressure chamber (29) containing at least one built-in liquid reservoir to control the pressure used to press the liquid out of the reservoir through the hollow cantilever (12) and tip opening or suck in liquid from the tip (14) back into the cantilever (12) or a built-in reservoir (31) in the probe holder (11).

14. A probe arrangement according to claim 12 wherein at least one of said built-in liquid reservoir (31) and said pressure chamber (29) is connected to a pressure controller (33).

15. A probe arrangement according to claim 1 wherein the cantilever channel (15) includes inner dimensions with a width and height between 0.1 µm and 1 mm and a length between 1 µm and 10 mm.

16. A probe arrangement according to claim 1 wherein the probe holder (11) further comprises:
positioning means, especially in form of a groove (26), for precise positioning of the various elements during the mounting of the probe unit (10a-g).

17. A prefabricated probe unit comprising:

a probe holder (11) of an Atomic Force Microscope (AFM) with at least one embedded first channel (18);

a cantilever (12) with at least one embedded second channel (15), the cantilever (12) attachable to said probe holder (11) in a way that at least one aperture (19) of the first channel (18) is connected to at least one aperture (17) of the second channel (15) to permit the liquid-tight transfer of a liquid between said first and second channels (15, 18); and an adhesive joint (27) permanently attaching said cantilever (12) to said probe holder (11) to form said prefabricated probe unit (10a-g), said prefabricated probe unit effective for exchanging liquids with micro-sized samples of biological cells, wherein said probe holder (11) is optically transparent enabling optical access to said cantilever (12), including access for laser based feedback.

* * * * *